(12) United States Patent
Barkowski

(10) Patent No.: US 7,945,380 B2
(45) Date of Patent: May 17, 2011

(54) METHOD FOR NAVIGATION OF A VEHICLE

(75) Inventor: Andre Barkowski, Salzgitter (DE)

(73) Assignee: Robert Bosch GmbH, Stuttgart (DE)

( * ) Notice: Subject to any disclaimer, the term of this patent is extended or adjusted under 35 U.S.C. 154(b) by 92 days.

(21) Appl. No.: 10/494,771

(22) PCT Filed: Sep. 6, 2002

(86) PCT No.: PCT/DE02/03316
§ 371 (c)(1),
(2), (4) Date: Dec. 9, 2004

(87) PCT Pub. No.: WO03/042951
PCT Pub. Date: May 22, 2003

(65) Prior Publication Data
US 2005/0090970 A1 Apr. 28, 2005

(30) Foreign Application Priority Data
Nov. 13, 2001 (DE) .................... 101 55 514

(51) Int. Cl.
*G01C 21/36* (2006.01)
(52) U.S. Cl. .......... 701/200; 340/995; 369/13.05; 369/13.21; 369/30.64
(58) Field of Classification Search .............. 701/200, 701/208, 36, 201, 209; 700/226; 340/990, 340/995.18; 342/357.01; 369/32, 13.05, 369/13.21, 30.64, 30.7
See application file for complete search history.

(56) References Cited

U.S. PATENT DOCUMENTS

| | | | | |
|---|---|---|---|---|
| 4,513,374 A | * | 4/1985 | Hooks, Jr. | 365/230.04 |
| 4,878,170 A | * | 10/1989 | Zeevi | 701/211 |
| 4,937,572 A | * | 6/1990 | Yamada et al. | 340/995.18 |
| 5,157,614 A | * | 10/1992 | Kashiwazaki et al. | 701/200 |
| 5,345,388 A | * | 9/1994 | Kashiwazaki | 701/213 |
| 5,515,284 A | * | 5/1996 | Abe | 701/202 |
| 5,535,125 A | * | 7/1996 | Okabe | 701/211 |
| 5,544,087 A | * | 8/1996 | Nakajima et al. | 701/200 |
| 5,592,389 A | * | 1/1997 | La Rue et al. | 701/211 |
| 5,608,635 A | * | 3/1997 | Tamai | 701/209 |
| 5,633,842 A | * | 5/1997 | Nishida et al. | 369/30.2 |
| 5,790,975 A | | 8/1998 | Kashiwazaki et al. | |
| 5,821,880 A | * | 10/1998 | Morimoto et al. | 340/995.21 |
| 5,944,768 A | * | 8/1999 | Ito et al. | 701/200 |

(Continued)

FOREIGN PATENT DOCUMENTS
DE 19808111 10/1998
(Continued)

OTHER PUBLICATIONS

Patent Abstracts of Japan, vol. 2000, No. 25, Apr. 12, 2001 & JP 2001 229369 A (Sumitomo Electric Ind Ltd), Aug. 24, 2001.
Patent Abstracts of Japan, vol. 1999, No. 01, Jan. 29, 1999 & JP 10 281777 A (NEC Home Electron Ltd), Oct. 23, 1998.

(Continued)

*Primary Examiner* — Tuan C To
(74) *Attorney, Agent, or Firm* — Kenyon & Kenyon LLP

(57) ABSTRACT

Method for navigating a vehicle in a road system is provided, in which method data is read from a data-storage medium and automatically transferred to a memory of a navigation device after the data medium is inserted into a data-media drive associated with the navigation device. The transferred data remains available for vehicle navigation even after the data medium is removed from the data-media drive.

9 Claims, 1 Drawing Sheet

U.S. PATENT DOCUMENTS

| | | | | |
|---|---|---|---|---|
| 6,138,073 A * | 10/2000 | Uchigaki | ................... | 701/208 |
| 6,163,749 A * | 12/2000 | McDonough et al. | ........ | 701/208 |
| 6,215,746 B1 * | 4/2001 | Ando et al. | ................. | 369/53.2 |
| 6,292,745 B1 * | 9/2001 | Robare et al. | ................. | 701/208 |
| 6,453,234 B1 * | 9/2002 | Noguchi et al. | ............... | 701/208 |
| 6,574,552 B2 * | 6/2003 | Yano et al. | .................... | 701/209 |
| 6,646,570 B1 * | 11/2003 | Yamada et al. | .......... | 340/995.23 |
| 6,721,654 B2 * | 4/2004 | Akiyama | ...................... | 701/209 |
| 2001/0002455 A1 * | 5/2001 | Uekawa et al. | ............... | 701/200 |
| 2001/0026276 A1 * | 10/2001 | Sakamoto et al. | ............ | 345/473 |
| 2001/0029427 A1 * | 10/2001 | Nagaki et al. | ................. | 701/208 |
| 2002/0004704 A1 * | 1/2002 | Nagatsuma et al. | .......... | 701/213 |
| 2002/0128771 A1 * | 9/2002 | Nagaki | ......................... | 701/208 |
| 2002/0152025 A1 * | 10/2002 | Shimada | ....................... | 701/209 |
| 2003/0058337 A1 | 3/2003 | Tanaka et al. | | |

FOREIGN PATENT DOCUMENTS

| | | |
|---|---|---|
| DE | 19947790 | 4/2001 |
| EP | 0 701 106 | 3/1995 |
| EP | 1 098 172 | 5/2001 |
| EP | 1 103 788 | 5/2001 |
| EP | 1 111 337 | 6/2001 |
| EP | 0782119 | 7/2003 |
| JP | 11-25898 | 5/1989 |

OTHER PUBLICATIONS

Patent Abstracts of Japan, vol. 1999, No. 12, Oct. 29, 1999 & JP 11 174953 A (Sumitomo Electric Ind Ltd), Jul. 2, 1999.

Patent Abstracts of Japan, vol. 2000, No. 12, Jan. 3, 2001 & JP 2000 251396 A (Toyota Motor Corp), Sep. 14, 2000.

* cited by examiner

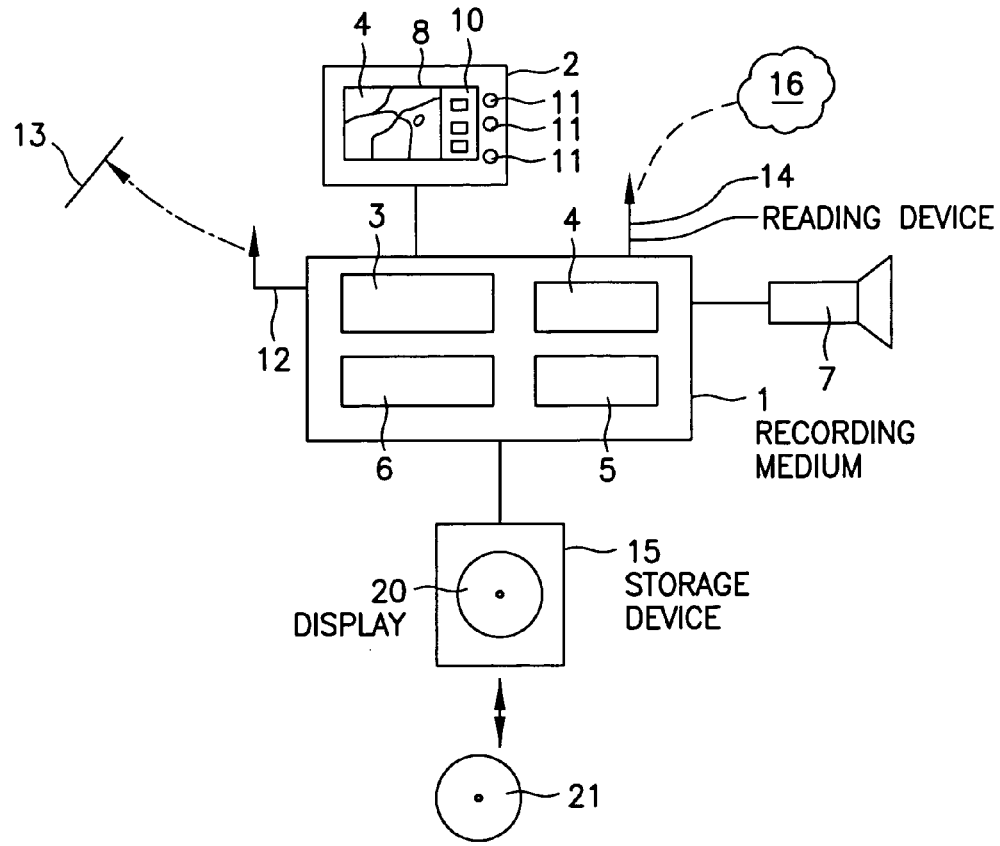
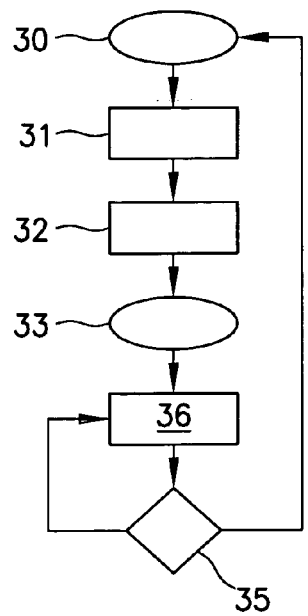
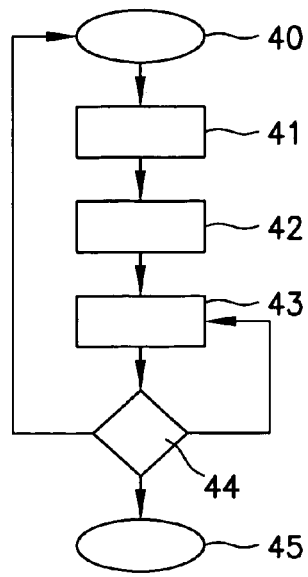
Fig. 1
Fig. 2
Fig. 3

METHOD FOR NAVIGATION OF A VEHICLE

FIELD OF THE INVENTION

The present invention is directed to a method for navigating a vehicle in a road system.

BACKGROUND INFORMATION

Navigation devices that require a data medium, e.g., a compact disc or a DVD (digital versatile disc), in order to perform navigation are already known. A digital map containing a road system is placed on the data medium, the navigation device regularly accessing the data medium to calculate the trip route and to output driving instructions. The expensive data-media drive is thus available in the vehicle only for the navigation device, or the drive cannot be used for other data media while vehicle navigation is being carried out. Navigation methods in which a navigation device in the vehicle accesses an external database without requiring a data medium in the vehicle are also known. However, additional costs are thereby incurred for data transfer.

SUMMARY

The method according to the present invention for navigating a vehicle in a road system has the advantage over the related art in that navigation data is automatically transferred to a memory of the navigation device immediately after the data medium is inserted into a data media drive. The transferred data is then available to the navigation device for vehicle navigation purposes, i.e., in particular for calculating the trip route and outputting driving instructions as well as for outputting additional information, without having to access the data medium again. As a result, the data-media drive may also be used for other purposes, e.g., for playing music or video data. In addition, navigation is possible within a limited area even without inserting a data medium, if permitted by the storage capacity of the navigation device memory. The direct access to the memory assigned to the navigation device also shortens the navigation-data access time.

It is advantageous that the inserted data medium may be removed after the navigation data has been transferred and another data medium may be inserted without having to interrupt the navigation function. This makes it possible, in particular, to link the data of different data media in the navigation device, e.g., the data media of different manufacturers or data media having different content. One example of this is linking a first data medium containing map data with a second data medium containing tourist information that may then be evaluated together by the navigation device.

A further advantage of the present invention is that a first map area is stored on a first data medium and a second map area on a second data medium, so that the trip route may be planned from the first map area to the second map area. For example, if a trip is to cross the border from Germany to France, the Germany CD may be inserted first and its relevant data transferred to the memory. A CD containing French map data is then inserted, the route also being planned through France. It is no longer necessary to subsequently change data media, since the relevant navigation data has been automatically transferred to the memory of the navigation device without prompting the user. The stored data may also be combined from multiple data sources, e.g., a travel guide for a mixed tour compiled from different travel guide data media, or navigation data combined from data media for multiple areas.

A further advantage of the present invention is that audio and/or video data may be stored on a second data medium, so that, for example, navigation does not have to be interrupted to play music, nor does an additional drive need to be installed in the vehicle, for example for a music compact disc.

It is further advantageous to store the data transferred from the data medium through non-volatile means in the navigation device so that the data remains available for further vehicle navigation even after turning off the vehicle or after a power failure.

It is further advantageous to store the data dependent on a selected function, the planned route or the present vehicle position. For example, the data that is especially likely to be accessed is transferred from the data medium to the navigation device.

In this regard, it is particularly advantageous to store data for the area surrounding a trip route so that it is not necessary to access the data medium again when traveling along the trip route within a corridor of a preselected width.

It is further advantageous to convert the navigation data to a different data format during the transfer. In particular, if the data is stored on the data medium in coded form, this makes it possible to store uncoded data directly in the memory assigned to the navigation device. This also makes it possible to convert data media of different manufacturers directly to a data format that is compatible with the navigation device when transferring data to the navigation device memory, so that the conversion of the data format does not take up any extra time when accessing the corresponding data.

BRIEF DESCRIPTION OF THE DRAWINGS

FIG. 1 shows a block diagram of a navigation device according to the present invention for carrying out the method according to the present invention.

FIG. 2 shows a flowchart of a portion of an exemplary embodiment of the method according to the present invention.

FIG. 3 shows a flowchart of another portion of the exemplary embodiment of the method according to the present invention.

DETAILED DESCRIPTION

FIG. 1 shows a navigation device 1 that is connected to a display unit 2. Navigation device 1 has an arithmetic unit 3, a main memory 4, a memory 5 for navigation data and a playback device 6 for audio and/or video data. In addition, a loudspeaker 7 is connected to navigation device 1, the loudspeaker of the car radio. Display unit 2 has a display area 8, which may be designed as a liquid crystal display. A map representation 9 having a road representation is displayed in display area 8. In addition, a control menu 10 that is operated by controls 11 next to display area 8, and which is used to control navigation device 1, is displayed in display area 8. A positioning device 12, which may be a GPS (Global Positioning System) satellite positioning device, may be used to determine a position of the vehicle in which navigation device 1 is located, via contact with a satellite 13. Additional data is retrievable from a mobile communications network 16 via a radio interface 14. In particular, a connection to the Internet is possible. A data media drive 15 into which a data medium 20 is insertable is also connected to navigation device 1. Data medium 20 may be ejected at the user's request and replaced by a second data medium 21. In a further exemplary embodiment, the data media drive may also be integrated into navigation device 1, or a data medium, e.g., a memory card, may instead be connected directly to navigation device 1 via a suitable interface.

Data media 20, 21 may be magnetic and/or optical data media, e.g., in the form of a compact disc, a magneto-optical disc or a DVD (digital versatile disc). Playback device 6 is used, in particular, as an audio or video tuner, a video signal being output via display unit 2 and an audio signal being output via loudspeaker 7. Main memory 4 is designed as a volatile memory and assigned to arithmetic unit 3. Memory 5 is used to record the navigation data transferred from data medium 20 to navigation device 1. In an exemplary embodiment, memory 5 is designed as a non-volatile memory, e.g., as a battery-backed volatile memory such as a RAM (random-access memory), a hard disk, a memory card or a rewritable magnetic and/or optical data medium. When data medium 20 is inserted into data media drive 15, arithmetic unit 3 initiates an automatic transfer of navigation data to memory 5. The navigation data is, for example, data of a digital road map. Further navigation data includes, for example, additional information such as information on road traffic, hotels and restaurants, tourist sights or gas stations as well as rest areas. Up-to-date traffic information is also retrievable via air interface 14 and taken into account for vehicle navigation. After the user makes an entry via controls 11, navigation device 1 calculates a trip route from the vehicle position determined via positioning device 12 to a destination entered via controls 11 on the basis of the navigation data transferred to memory 5. Arithmetic unit 3 uses this information to determine driving instructions, which are output to the driver via the loudspeaker and/or display unit 2.

In an exemplary embodiment of the method according to the present invention, data is input from different navigation data media and taken into account for vehicle navigation. If a user would like to drive, for example, from a city in Germany to a French city, and if the road map information is only located on two different data media, the user is first prompted to insert the first data medium containing the German map data. A portion of the map data is transferred to memory 5, depending on the present vehicle position. The user is then prompted to insert the second data medium containing the French map data. The optimum trip route is determined on the basis of the transferred map data. If the user removes the data medium from data media drive 15 too early, a warning thereof is output via the loudspeaker and/or display 2.

FIG. 2 shows a flowchart of a portion of an exemplary embodiment of a method according to the present invention. Based on a prompt step 30, a user is prompted to insert a navigation data medium into data media drive 15. In a determination step 31, the data transferred to memory 5 of navigation device 1 is then determined, for example, as a function of the trip route or the destination entered via controls 11. In a subsequent transfer step 32, this data is read from data medium 20 immediately, if possible, after data medium 20 is inserted, transferred to navigation device 1 and stored in memory 5. There, the data is available for processing by arithmetic unit 3. It is not necessary to prompt the user to transfer the data, since the data transfer is started automatically by navigation device 1. A further transfer desired by the user may also be requested, for example, via control panel 11. If necessary, the data is decoded by arithmetic unit 3 during the transfer. In a subsequent notification step 33, a message to the user is output stating that the necessary data transfer has been completed and the data medium is no longer needed for the time being. If the user would like to play music or a video, he may insert another data medium 21 into data media drive 15 and start playing music 34. In a subsequent checking step 35, a check is carried out at regular, preselected intervals to ascertain whether the data medium is needed again. While traveling the previously calculated route, this will not be the case, since all relevant data is stored in memory 5 and thus available to arithmetic unit 3. If data medium 20 is not needed, music playback 34 continues. If, however, it is determined that the previous data medium is required again, or that another data medium must be inserted, the method branches back to prompt step 30.

FIG. 3 shows another portion of the exemplary embodiment of a method according to the present invention. Based on a route calculation step 40, a trip route is calculated from a starting point to a destination, if necessary, including necessary driving instructions. In a subsequent determination step 41, the navigation data transferred from data medium 20 to memory 5 is determined. In particular, a corridor surrounding the trip route is determined. This corridor may be determined, for example narrowly in the vicinity of the starting point and destination, then broadened as needed in the direction of the middle of the route. If necessary, it is also possible to make an assignment to geographic sectors that are limited, for example, by specifying limits in a coordinate system, e.g., the degrees of longitude and latitude. If necessary, driver preferences that may be stored in, or are preselectable by, navigation device 1 may be taken into account. For example, only side streets, or only the data of highways, may be transferred. This transfer then takes place in subsequent transfer step 42. In a subsequent output step 43, the individual driving instructions and any necessary additional tourist information are optically and/or acoustically output to the user via display unit 2 and/or loudspeaker 7. In a subsequent position checking step 44, the present vehicle position is checked. If it is determined that the destination has been reached, the vehicle navigation ends in a termination step 45. If it is determined that the vehicle is still located in the predefined corridor, the method branches back to output step 43 for outputting the next set of driving instructions. If it is determined in position checking step 44 that the vehicle has left the corridor, for example due to a traffic holdup, either at the user's request or due to a necessary route change as a result of a traffic holdup transmitted via air interface 14, the method branches back to route calculation step 40, and the trip route is modified. Although the data medium is no longer needed following transfer step 42, it must nevertheless be inserted again for route calculation step 40.

It is also possible to display, in display area 8, the time remaining until the data has been fully transferred to memory 5. In particular, the prompt to insert the data medium may also be output acoustically via loudspeaker 7. Likewise, a warning is output if the data has not yet been fully transferred to memory 5.

What is claimed is:

1. A method for performing a vehicle navigation along a road system using a navigation device, comprising:

receiving a destination input from a user of the navigation device;

prompting the user to insert a first data medium containing navigation data, including a first map area corresponding to a starting location of a vehicle, into a data-reading arrangement associated with the navigation device, wherein the data-reading arrangement is a data-media drive connected to the navigation device;

automatically transferring the navigation data to a memory of the navigation device;

after automatically transferring the navigation data to the memory, determining, at the navigation device, that the first data medium does not contain navigation data needed to reach the destination;

responsive to the determining, prompting the user to replace the first data medium with a second data medium containing the needed navigation data, including a second map area corresponding to the destination, wherein the second data medium does not contain data corresponding to the first map area;

after the first data medium is replaced with the second data medium, automatically transferring additional navigation data from the second data medium to the memory;

at the navigation device, responsive to the transferring of the additional navigation data, calculating a trip route from the first map area to the second map area, using the automatically transferred navigation data to calculate a portion of the trip route along the first map area, and using the additional navigation data to calculate a portion of the trip route along the second map area; and outputting navigation instructions to the user based on the calculated trip route.

2. The method as recited in claim 1, wherein selective portions of the navigation data corresponding to map features along the trip route are stored in the memory as a function of at least one of: a selected function of the navigation device; a user profile; a present vehicle position; and a calculated trip route.

3. The method as recited in claim 2, wherein data for a selected area surrounding the calculated trip route is stored in the navigation device.

4. The method as recited in claim 1, further comprising: changing a data format of the navigation data during the automatic transfer of the navigation data to the memory.

5. The method as recited in claim 1, further comprising: changing a data format of the navigation data during the automatic transfer of the navigation data to the memory; wherein selective portions of the navigation data corresponding to map features along the trip route are stored in the memory as a function of at least one of: a selected function of the navigation device, a user profile, a present vehicle position, and a calculated trip route, and wherein data for a selected area surrounding the calculated trip route is stored in the navigation device.

6. The method as recited in claim 3, wherein a width of the surrounding area is narrower in the vicinity of the starting location and the destination compared to a width of the surrounding area near the middle of the calculated trip route.

7. The method as recited in claim 1, further comprising: changing a data format of the navigation data during the automatic transfer of the navigation data to the memory; wherein selective portions of the navigation data corresponding to map features along the trip route are stored in the memory as a function of at least one of: a selected function of the navigation device, a user profile, a present vehicle position, and a calculated trip route, and wherein data for a selected area surrounding the calculated trip route is stored in the navigation device, and wherein a width of the surrounding area is narrower in the vicinity of the starting location and the destination compared to a width of the surrounding area near the middle of the calculated trip route.

8. The method as recited in claim 7, wherein selective portions of the navigation data corresponding to map features along the trip route are stored in the memory as a function of at least one of: a selected function of the navigation device; a user profile; a present vehicle position; and a calculated trip route, and wherein data for a selected area surrounding the calculated trip route is stored in the navigation device.

9. A method for performing a vehicle navigation along a road system using a navigation device, comprising:

transferring navigation data contained in a first data medium to a memory of the navigation device;

calculating a trip route using the transferred navigation data;

after calculating the trip route, locating, in the first data medium, additional navigation data corresponding to an area surrounding the trip route, wherein the navigation device determines the area surrounding the trip route narrowly in a vicinity of a starting point and a destination, relative to a portion of the area surrounding the trip route corresponding to a middle of the route;

transferring the additional navigation data from the first data medium to the memory;

outputting navigation instructions based on the calculated trip route;

periodically determining whether the vehicle is located in the area surrounding the trip route; and responsive to determining that the vehicle is no longer in the area surrounding the trip route, re-calculating the trip route using new navigation data from the first data medium.

* * * * *